United States Patent

[11] 3,572,034

| [72] | Inventor | Alan R. Fisher<br>Highland Park, Mich. |
| --- | --- | --- |
| [21] | Appl. No. | 878,718 |
| [22] | Filed | Nov. 21, 1969 |
| [45] | Patented | Mar. 23, 1971 |
| [73] | Assignee | Ford Motor Company<br>Dearborn, Mich. |

[54] FABRICATED TWO-PIECE STATOR ASSEMBLY FOR HYDROKINETIC TORQUE CONVERTERS
15 Claims, 11 Drawing Figs.

[52] U.S. Cl. .................................................... 60/54,
415/219, 416/180
[51] Int. Cl. ...................................................F16d 31/06,
F16h 41/04
[50] Field of Search .......................................... 60/54;
416/180, 189, 192, 195, (Inquired); 415/217, 219,
(Inquired); cards

[56] References Cited
UNITED STATES PATENTS

| 2,335,091 | 11/1943 | Utz.............................. | 416/189 |
| --- | --- | --- | --- |
| 2,432,185 | 12/1947 | Watson ....................... | 416/181 |
| 2,696,171 | 12/1954 | Jandasek et al............. | 415/217 |
| 3,014,430 | 12/1961 | Schneider..................... | 416/240 |

Primary Examiner—Edgar W. Geoghegan
Attorneys—John R. Faulkner and Donald J. Harrington ABSTRACT: A bladed stator assembly comprising two circular bladed sections situated in adjacent relationship, each section complementing the other, one section defining a fluid flow entrance region and the other section defining a fluid flow exit region, and radially displaced blades, each blade including a leading edge portion integrally formed on one stator section and a trailing edge portion integrally formed on the other stator section.

INVENTOR:
ALAN R. FISHER

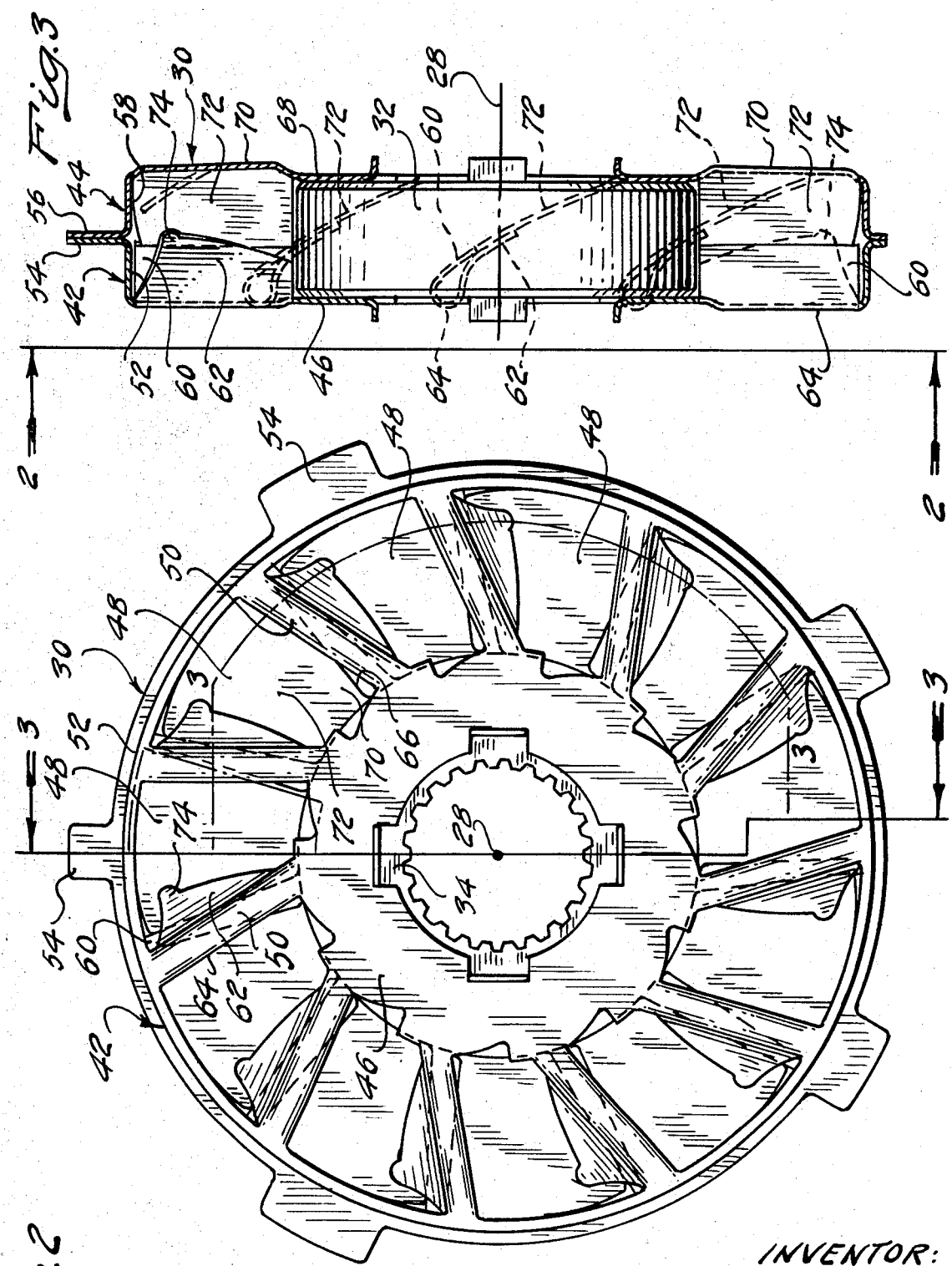

INVENTOR:
ALAN R. FISHER
BY: [signatures]
ATTORNEYS.

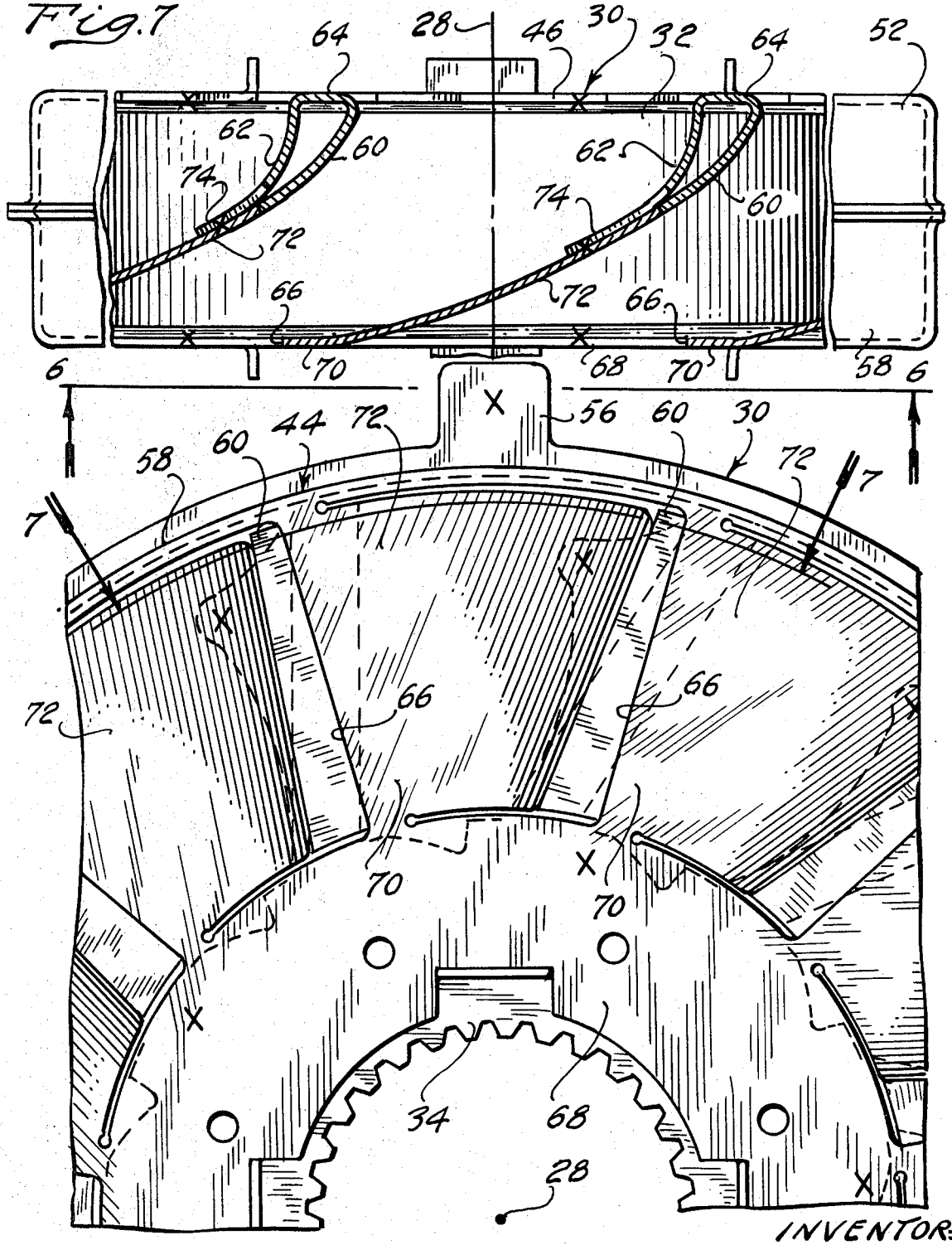

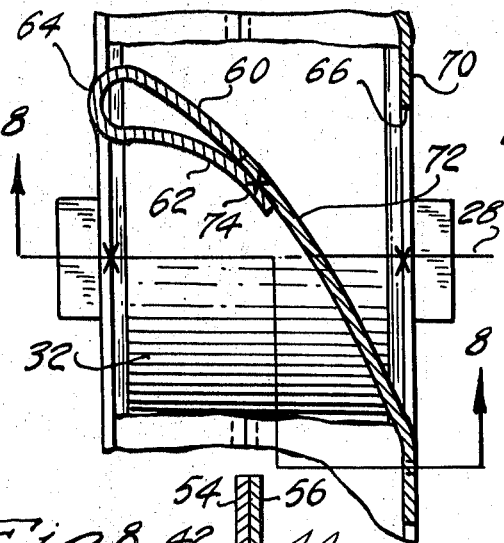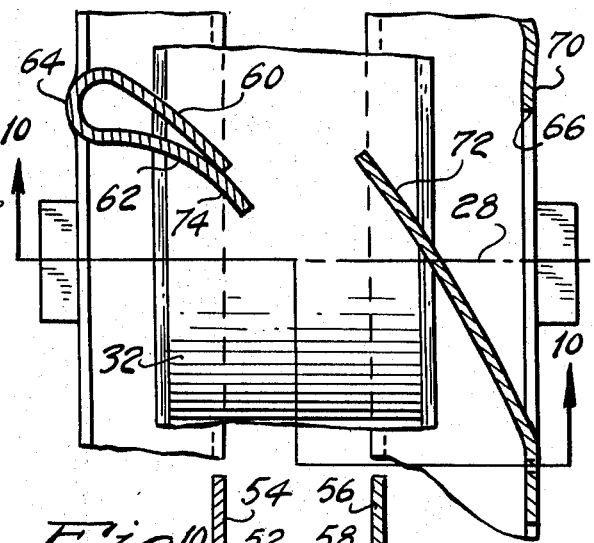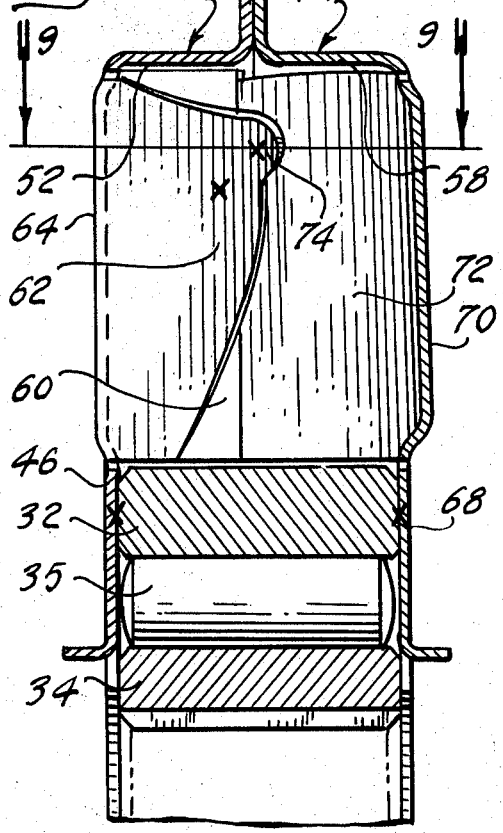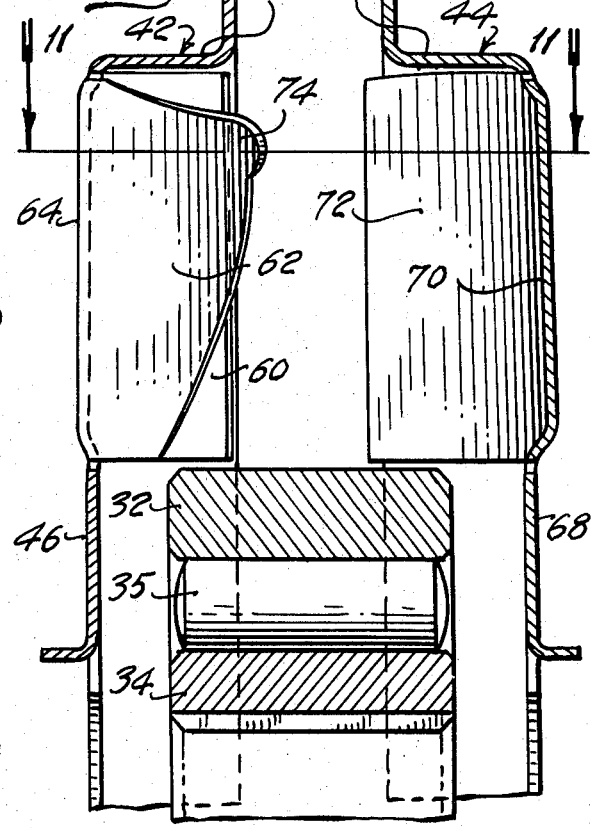

FABRICATED TWO-PIECE STATOR ASSEMBLY FOR HYDROKINETIC TORQUE CONVERTERS

BRIEF DESCRIPTION OF THE INVENTION

The improvements of my invention are adapted to be used especially in fabricating a stamped, sheet metal stator for a hydrokinetic torque converter. Torque converters used in automotive vehicle drivelines usually include a bladed impeller a bladed turbine, and a bladed stator situated in toroidal, fluid flow relationship. The bladed stator is located at a radially inward region in the torus circuit between the fluid flow exit region of the turbine and the fluid flow entrance region of the impeller. It changes the direction of the tangential component of the axial fluid flow velocity vector for particles of fluid traveling in the torus circuit when torque is delivered through the hydrokinetic unit. The resulting torque reaction imposed on the stator is accompanied by a torque augmentation. The maximum torque ratio in the hydrokinetic unit occurs during the stall condition when the speed ratio of the hydrokinetic unit is zero. As the speed ratio increases, the torque multiplication decreases until a coupling condition is achieved. At that time, the stator freewheels, the freewheeling motion being permitted by an overrunning brake which distributes the stator torque conversion range.

Because of the wide variation in torque ratio, a large change is induced in the angle of the fluid flow velocity vector for a fluid particle passing through the exit region of the turbine. It is necessary, therefore, for the stator to be formed with blades having a relatively large radius on their leading edges or nose portions. The main portion of each blade should have a trailing edge situated at an angle that is substantially offset in angular disposition with respect to the blade angle at the entrance section. The length of the stator blades and the wide variations of the effective blade angle make it difficult to form a bladed stator by die casting techniques since the angularity of the blades prevents axial movement of one die half with respect to the other as the die halves are drawn apart.

In another fabricating technique, the individual blades are assembled between inner and outer shrouds for the stator and fixed to the shrouds by mechanical fastening parts such as slots and tabs. This results in a complicated and costly assembly.

In my improved stator construction, I have provided two separate stator halves, one being an entrance section and the other an exit section. Each section comprises a wall portion, an inner shroud ring and integral blade sections which join the shroud ring and the inner wall portion. The bladed sections in my preferred embodiment are formed of stamped sheet metal and the trailing edge part of each entrance blade section is rounded with one margin overlying an intermediate portion of the associated blade element. The trailing or exit sections of the blades are integrally formed on the second or exit section of the stator. This section also is formed with an inner shroud ring and an outer shroud ring with the associated blade sections joined integrally to the rings. The entrance section of each individual blade registers with and matches a trailing edge section of the exit stator section. The two stator sections may be joined together by welding to form a unitary assembly. the blade sections also my be welded together to form unitary blade elements having a continuous contour from the entrance edge to the trailing edge.

In this way the optimum blade geometry can be achieved without compromising the blade design to satisfy manufacturing limitations. Improved converter performance thus is obtained. At the same time, the cost of manufacturing the stator is reduced substantially in comparison to the cost of making a die cast stator and fabricated sheet metal stators of known design.

BRIEF DESCRIPTION OF THE FIGURES OF THE DRAWINGS

FIG. 2 is a cross-sectional view taken along the plane of section line 2–2 of FIG. 1 This view shows the fabricated stator of my invention in elevation.

FIG. 3 is a cross-sectional view taken along the plane of section line 3–3 of FIG. 2.

FIG. 6 is a cross-sectional view taken along the plane of section line 6–6 of FIG. 1.

FIG. 7 is a cross-sectional view taken along the plane of section line 7–7 of FIG. 6.

FIG. 8 is a view taken along the plane of section line 8–8 of FIG. 4.

FIG. 9 is a cross-sectional view taken along the plane of section line 9–9 of FIG. 8. The plane of this section is parallel to the axis of the stator.

FIG. 10 is a view similar to FIG. 8, although it shows the entrance section of the stator separated axially from the trailing edge section of the stator.

FIG. 11 is a cross-sectional view taken along the plane of section line 11–11 of FIG. 10. This view is similar to FIG. 9 although it differs from FIG. 9 in that the entrance section of the blade is separated from the trailing edge section of the blade in an axial direction.

PARTICULAR DESCRIPTION OF THE INVENTION

Figure 1:
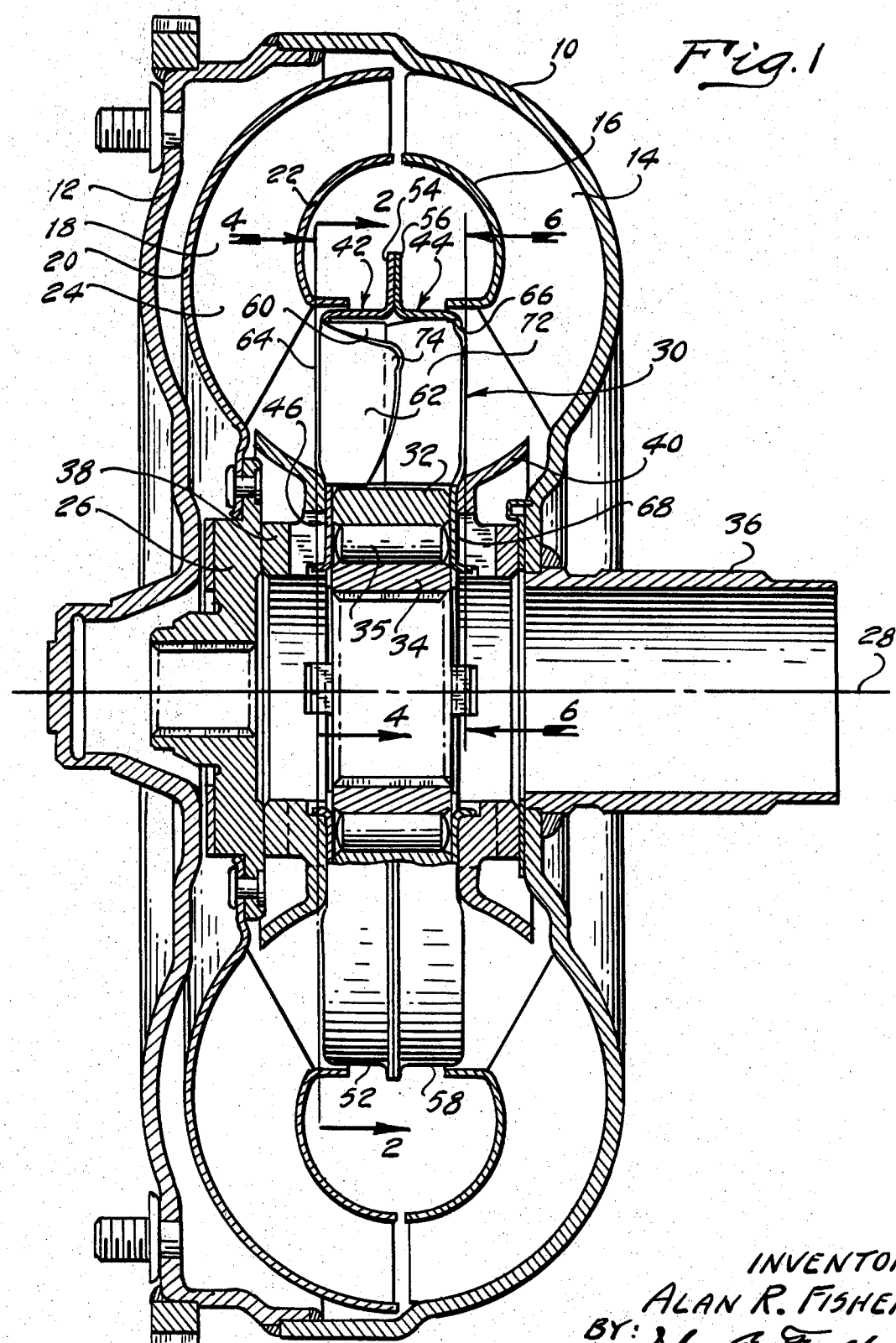
FIG. 1 shows in longitudinal cross-sectional form a hydrokinetic torque converter embodying the improved stator construction of my invention.
Figure 5:
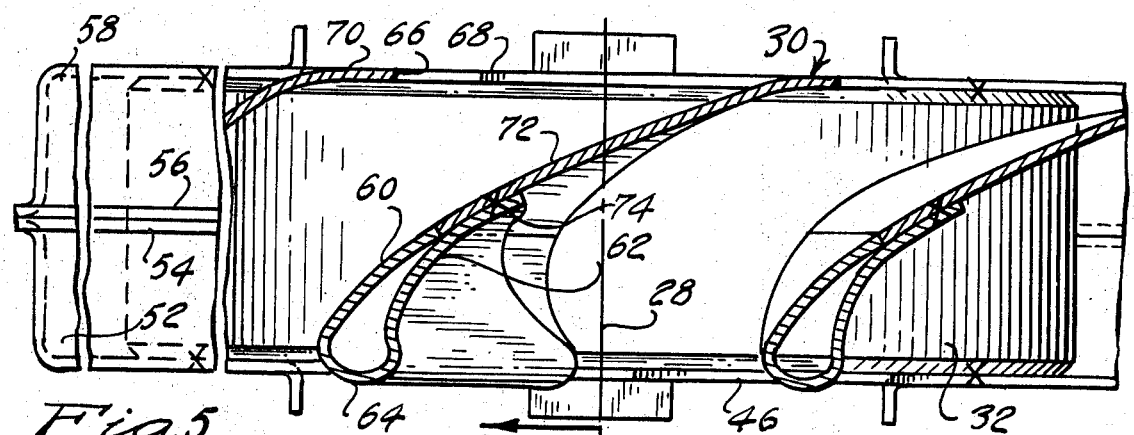
FIG. 5 is a cross-sectional view taken along the plane of section line 5–5 of FIG. 4. The plane of this section is parallel to the axis of the stator.
Figure 4:
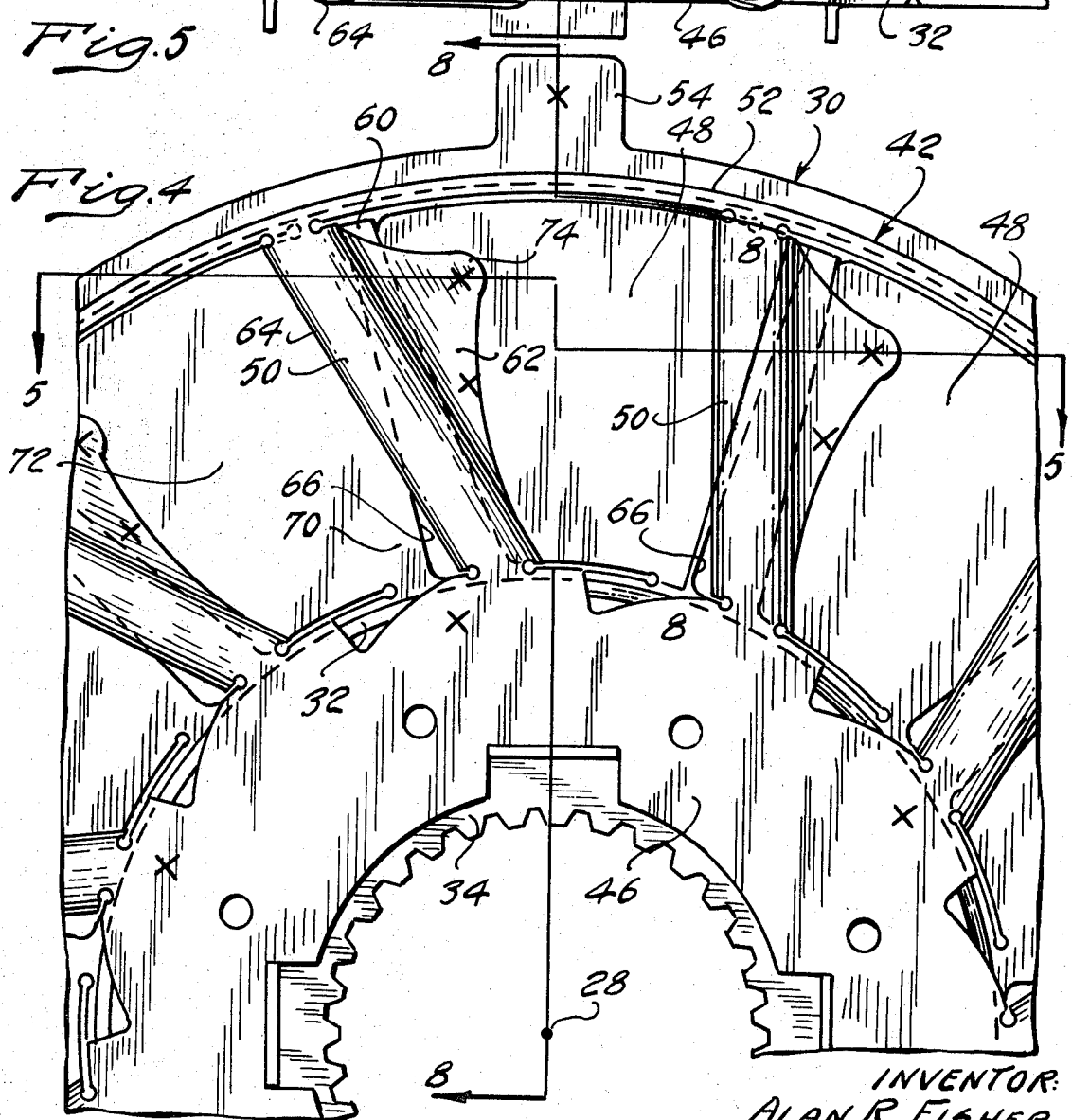
FIG. 4 is a cross-sectional view taken along the plane of section line 4–4 of FIG. 1.

In FIG. 1 numeral 10 designates one part of an impeller shell of a hydrokinetic torque converter. A companion shell part 12 is welded to the shell part 10 to form a sealed torus cavity. Shell part 12 can be connected in the usual fashion to the crankshaft of an internal combustion engine by means of a drive plate. Impeller blades 14 are received within the shell part 10 and cooperate to define radial outflow passages. An inner impeller shroud 16 is secured to the inner margins of the blades 14.

Turbine 18 is enclosed by the impeller shell or housing. It includes an outer turbine shroud 20, an inner turbine shroud 22 and turbine blades 24 situated between the shrouds. Shroud 20 is connected drivably to turbine hub 26. Hub 26 is internally splined to permit a driving connection with a turbine shaft (not shown), which would extend axially in coaxial disposition with respect to the axis 28 of the converter.

A bladed stator 30 is situated between the flow exit section of the turbine blades 24 and the flow entrance section of the impeller blades 14. Stator 30 includes a hub, which comprises an overrunning brake race 34. Overrunning brake roller elements 35 cooperate with cam surfaces formed on race 32 thereby braking the stator 30 against rotation in one direction by permitting freewheeling motion in the direction of rotation of the turbine. Race 34 is internally splined to permit spline connection with a stationary sleeve shaft (not shown) extending axially and mounted around the turbine shaft. Sleeve shaft 36 forms a hub for the impeller. It is connected directly to the hub shell part 10.

A first spacer 38 separates the hub 26 from the overrunning brake races 32 and 34. Another spacer 40 separates the hub of the shell part 10 from the overrunning brake races 32 and 34. The stator 30 will be described more particularly with reference to the other FIGS.

The stator 30 comprises an entrance section 42 and an exit section 44. The entrance section comprises a forward sheet metal wall 46 in which are pierced openings 48. These openings are situated in evenly spaced, angular disposition around the axis 28. The portion of the wall 46 between two adjacent openings 48 defines a leading edge 50 of the stator blade. These leading edge portions 50 join together the radially innermost part of the wall 46 and the radial outer part thereof. The inner part of the wall 46 is situated directly adjacent the overrunning brake races 32 and 34, and is welded to race 32. The openings 48 can be formed by a die punch during the same forming operation in which the outer shroud is indicated, for example, in FIGS. 8 and 10 by reference character 52. The outer margin of the shroud 52 extends radially outwardly to form a flange 54, which is arranged in abutting relationship with respect to flange 56 formed on the exit section 44. Flange 56 forms a part of shroud 58 for the stator section 44. The metal that is cut by the stamping die to form the openings 48 is bent in a reentrant fashion, as indicated in FIGS. 3, 5, 7, 9 and 11. The metal part 60 cut from one opening 48 is bent inwardly and overlies the metal part 62, which is cut from an adjacent opening 48. The two metal parts 60 and 62 can be welded together thereby forming a rounded nose portion 64, for the leading edge 50 of a blade.

The exit section 44 of the stator also can be formed by means of a stamping operation. The stamping dies form openings 66 as indicated best in FIG. 6. These openings are similar to each other and they are angularly positioned uniformly about the axis 28. The ends of the metal that is displaced from the opening 66 are bent inwardly as indicated in FIGS. 9 and 11, as well as in FIG. 7. The exit section 44 includes a wall 68, which si welded at its radially inward extremity to the sides of the race 32. The wall 68 extends radially outwardly, and the portion 70 of the wall 68 defines the trailing edge portion of the sheet metal part 72, which is displaced during the stamping operation.

The unhinged margin of the sheet metal part 72 registers with an overlap sheet metal part 62. The two parts of each blade then are joined together to form a unitary blade element.

When the stator sections are welded together and the leading edge portion of the blade is secured to the trailing edge portion, the resulting structure is a bladed assembly that is structurally rigid and capable of accommodating the reaction torque developed during operation in the torque conversion range of the hydrokinetic unit. The trailing edge part of the sheet metal portion 62 can be shaped as illustrated in FIGS. 4, 5, 8, and 10 to provide an overlapping joint, which would permit the spot welding of that portion of the leading edge portion of the sheet metal part 72. The overlapping parts of the sheet metal blade portions are identified, for example, in FIG. 8 and by reference character 74.

The nose portion of variable chamber section of each individual blade is defined solely by the reentrant, bended parts 60 and 62. The companion sheet metal part 72 for the exit section of the stator is of uniform thickness.

The stator 2 shows the locations of spot welds on the flanges 54 and 56. AFter the assembly is welded together, it may be coated by dipping or spraying with a suitable plastic to provide continuous, smooth, fluid-flow paths across the individual blades. This coating step and manufacturing process would eliminate undesirable flow resistance to the toroidal fluid flow, which might be caused by surface irregularities in the stator member due to the abutting relationship between the blade edges and the overlapping portions of the leading edge portions of the blade with respect to the trailing edge portions thereof. The coating step could be used also to fill all cracks and holes due to manufacturing imperfections.

I claim:

1. A bladed flow-directing member comprising a fluid flow entrance section and a fluid flow exit section, said entrance section comprising a first radial wall located at the entrance edge of said entrance the outer peripheral margin of said wall being deformed in the direction of flow to form a first flow directing shroud, flow aperture in said wall formed at angularly spaced positions about the axis of said member, one margin of each aperture being joined to a portion of said wall displaced therefrom to form said opening, said wall portions being deformed in the direction of flow to define a variable camber leading edge blade portion, said flow exit section of said member comprising a trailing edge wall, the margin of said trailing edge wall being joined to the margin of said flow entrance section at its outer periphery, flow apertures formed in said trailing edge wall at angularly spaced positions about the axis of said member, one margin of each of said last-named apertures being joined integrally with the trailing edge wall portion displaced from said trailing edge wall to form the apertures therein, said last-named wall portion registering with the wall portion displaced from said blade entrance section wall to define a continuous blade element.

2. A fluid flow directing member comprising a flow entrance section and a flow exit section, said entrance section comprising a radial wall having flow apertures formed therein, said exit section wall also having flow apertures formed therein, the outer peripheral margin of said walls being joined together to define a flow-directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements.

3. A fluid flow directing member comprising a flow entrance section and a flow exist section, said entrance section comprising a radial wall having flow apertures formed therein, said exit section wall also having flow apertures formed therein, the outer peripheral margin of said walls being joined together to define a flow directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements, the material displaced from one aperture of said flow entrance wall overlying the material displaced from an adjacent aperture in said flow entrance wall thereby defining a variable camber blade entrance section which is adapted to register with the material displaced from an aperture in said flow exit wall.

4. A fluid flow directing member comprising a flow entrance section and a flow exit section, said entrance section comprising a radial wall having flow apertures formed therein, said exit section wall also having flow apertures formed therein, the outer peripheral margin of said walls being joined together to define a flow-directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements, and means for securing rigidly together the registering portions of the blade sections defined by the material displaced from said flow exit wall and the material displaced from said entrance wall thereby defining rigid blade elements at angularly spaced locations about the axis of said member.

5. A fluid flow directing member comprising a flow entrance section and a flow exit section said entrance section comprising a radial wall having flow apertures formed therein, said exit section wall also having flow apertures formed therein, the outer peripheral margin of said walls being joined together to define a flow-directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements, the material displaced from one aperture of said flow entrance wall overlying the material displaced from an adjacent aperture in said flow entrance wall thereby defining a variable camber blade entrance section which is adapted to register with the material displaced from an aperture in said flow exit wall, and means for securing rigidly together the registering portions of the blade sections defined by the material displaced from said flow exit wall and the material displaced from said entrance wall thereby defining rigid blade elements at angularly spaced locations about the axis of said member.

6. A hydrokinetic torque converter comprising a bladed impeller and a bladed turbine situated in toroidal fluid flow relationship and a common torus circuit, a flow directing stator situated between the flow exit region of said turbine and the flow entrance region of said impeller, a bladed flow-directing member comprising a fluid flow entrance section and a fluid flow exit section, said entrance section comprising a first wall located at the entrance edge of said member, flow openings in said wall formed at angularly spaced positions about the axis of said member, one margin of each opening being joined to portions of said wall displaced therefrom to form said openings, said wall portions being deformed in the direction of flow to define a variable chamber leading edge blade portion, said flow exit section of said member comprising a trailing edge wall, the margin of said trailing edge wall being joined to the margin of said flow entrance wall at their outer margins, flow apertures formed in said trailing edge wall at angularly spaced positions about the axis of said member, one margin of said last-named openings being joined integrally with wall portions displaced from said trailing edge wall to form the apertures therein, said last-named wall portions registering with the wall portion defining said blade entrance section to define continuous blade elements.

7. A hydrokinetic torque converter comprising a bladed impeller and a bladed turbine situated in toroidal fluid flow relationship and a common torus circuit, a flow directing stator situated between the flow exit region of said turbine and the flow entrance region of said impeller, a fluid flow directing member comprising a flow entrance section and a flow exit section, said entrance section comprising a wall having flow apertures formed therein, said exit section comprising a wall with flow apertures formed therein, the outer peripheral margin of said wall being joined together to define a flow directing shroud, the material displaced from the apertures in said flow entrance wall being joined to said flow entrance wall at one margin of its associated aperture the material displaced from the apertures in said flow exit wall being joined to said flow exit wall at one margin of the associated aperture, the material displaced from the openings in said entrance wall being deformed in the direction of flow, the material displaced from the apertures and said flow exit wall being deformed so that it registers with the material displaced from the flow entrance wall to define continuous blade elements.

8. A hydrokinetic torque converter comprising a bladed impeller and a bladed turbine situated in toroidal fluid flow relationship and a common torus circuit, a flow directing stator member situated between the flow exit region of said turbine and the entrance region said impeller, said fluid flow directing member comprising a flow entrance section and a flow exit section, said entrance section comprising a radial wall having flow apertures formed therein, said exit section wall also having flow apertures formed therein, the outer peripheral margin of said walls being joined together to define a flow directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being formed in the direction in flow, the material displaced from the apertures in said flow exit section wall being deformed so that it registers with the material displaced from the flow entrance section to define continuous blade elements, the material displaced form one aperture of said flow entrance wall overlying the material displaced from an adjacent aperture in said flow entrance wall thereby defining a variable camber blade entrance section which is adapted to register with the material displaced from an aperture in said flow exit wall.

9. A hydrokinetic torque converter comprising a bladed impeller and a bladed turbine situated in toroidal fluid flow relationship and a common torus circuit, a flow directing stator member situated between the flow exit region of said turbine and the flow entrance region of said impeller, said fluid flow directing member comprising a flow entrance section and a flow exit section, said entrance section comprising a radial wall having flow apertures formed therein, said exit section wall also having flow apertures formed therein, the outer peripheral margin of said walls being joined together to define a flow-directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements, the means for securing rigidly together the registering portions of the blade sections defined by the material displaced from said flow exit wall and the material displaced from said entrance wall thereby defining rigid blade elements at angularly spaced locations about the axis of said member.

10. A hydrokinetic torque converter comprising a bladed impeller and a bladed turbine situated in toroidal fluid flow relationship and a common torus circuit, a flow-directing stator member situated between the flow exit region of said turbine and the flow entrance region of said impeller, said fluid flow directing member comprising a flow entrance section and a flow exit section, said entrance comprising a radial wall having flow apertures formed therein, said exit section wall also having flow apertures formed therein, the outer peripheral margin of said walls being joined together to define a flow directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements, the material displaced from one aperture of said flow entrance wall overlying the material displaced from an adjacent aperture in said flow entrance wall thereby defining a variable camber blade entrance section which is adapted to register with the material displaced from an aperture in said flow exit wall, and means for securing rigidly together the registering portions of the blade sections defined by the material displaced from said flow exit wall and the material displaced from said entrance wall thereby defining rigid blade elements at angularly spaced locations about he axis of said member.

11. A hydrokinetic torque converter comprising a bladed impeller and a bladed turbine situated in toroidal fluid flow relationship and a common torus circuit, a flow-directing stator situated between the flow exit region of said turbine and the flow entrance region of said impeller, a bladed flow-directing member comprising a fluid flow entrance section and a fluid flow exit section, said entrance section comprising a first wall located at the entrance edge of said member, flow openings in said wall formed at angularly spaced positions about the axis of said member, one margin of each opening being joined to portions of said wall displaced therefrom to form said openings, said wall portions being deformed in the direction of flow to define a variable camber leading edge blade portion, said flow exit section of said member comprising a trailing edge wall, the margin of said trailing edge wall being joined to the margin of said flow entrance wall at their outer margins, flow apertures formed in said trailing edge wall at angularly spaced positions about the axis of said member, one margin of said last name openings being joined integrally with wall portions displaced from said trailing edge wall to form the apertures therein, said last named wall portions registering with the wall portions defining said blade entrance section to define continuous blade elements, said stator comprising a hub, the blade elements defined by said flow entrance section and said flow exit section being arranged in angularly spaced disposition about said hub and extending in a radially outward direction therefrom, said hub comprising an overrunning brake outer race connected to the radial inward portion of said walls, an overrunning brake inner race, overrunning brake elements situated between said races and adapted to accommodate freewheeling of said outer race in one direction while preventing relative rotation between said races in the opposite direction, said inner race being adapted to be connected to a stationary member of said torque converter.

12. A hydrokinetic torque converter comprising a bladed impeller and a bladed turbine situated in toroidal fluid flow relationship and a common torus circuit, a flow-directing stator situated between the flow exit region of said turbine and the flow entrance region of said impeller, a bladed flow-directing member comprising a fluid flow entrance section and a fluid flow exit section, said entrance section comprising a first wall located at the entrance edge of said member, flow openings in said wall formed at angularly spaced positions about the axis of said member, one margin of each opening being joined to portions of said wall displaced therefrom to form said openings, said wall portions being deformed in the direction of flow to define a variable camber leading edge blade portion, said flow exit section of said member comprising a trailing edge wall, the margin of said trailing edge wall being joined to the margin of said flow entrance wall at their outer margins, flow apertures formed in said trailing edge wall at angularly spaced positions about the axis of said member, one margin of said last name openings being joined integrally with wall portions displaced from said trailing edge wall to form the apertures therein, said last-named wall portions registering with the wall portion defining said blade entrance section to define continuous blade elements, said stator comprising a hub, the blade elements defined by said flow entrance section and said flow exit section being arranged in angularly spaced disposition about said hub and extending in a radially outward direction therefrom, said hub comprising an overrunning brake outer race connected to the radial inward portion of said walls, an overrunning brake inner race, overrunning brake elements situated between said races and adapted to accommodate freewheeling of said outer race in one direction while preventing relative rotation between said races in the opposite direction, said inner race being adapted to be connected to a stationary member of said torque converter.

13. A hydrokinetic torque converter comprising a bladed impeller and a bladed turbine situated in toroidal fluid flow relationship and a common torus circuit, a flow-directing stator member situated between the flow exit region of said turbine and the flow entrance region of said impeller, said fluid flow directing member comprising a flow entrance section and a flow exit section, said entrance section comprising a radial wall having flow apertures formed therein, said exit section wall also having flow apertures formed therein, the outer peripheral margin of said walls being joined together to define a flow directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being formed in the direction of flow, the material displaced from the apertures in said flow exit section wall being deformed so that it registers with the material displaced from the flow entrance section to define continuous blade elements, the material displaced from one aperture of said flow entrance wall overlying the material displaced from an adjacent aperture in said flow entrance wall thereby defining a variable camber blade entrance section which is adapted to register with the material displaced from an aperture in said flow exit wall, said stator comprising a hub, the blade elements defined by said flow entrance section and said flow exit section being arranged in angularly spaced disposition about said hub and extending in a radially outward direction therefrom, said hub comprising an overrunning brake outer race connected to the radial inward portion of said walls, an overrunning brake inner race, overrunning brake elements situated between said races and adapted to accommodate freewheeling of said outer race in one direction while preventing relative rotation between said races in the opposite direction, said inner race being adapted to be connected to a stationary member of said torque converter.

14. A hydrokinetic torque converter comprising a bladed impeller and a bladed turbine situated in toroidal fluid flow relationship and a common torus circuit, a flow-directing stator member situated between the flow exit region of said turbine and the flow entrance region of said impeller, said fluid flow directing member comprising a flow entrance section and a flow exit section, said entrance section comprising a radial wall having flow apertures formed therein, said exit section wall also having flow apertures formed therein, the outer peripheral margin of said walls being joined together to define a flow directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements, and means for securing rigidly together the registering portions of the blade sections defined by the material displaced from said flow exit wall and the material displaced from said entrance wall thereby defining rigid blade elements at angularly spaced locations about the axis of said member, said stator comprising a hub, the blade elements defined by said flow entrance section and said flow exit section being arranged in angularly spaced disposition about said hub and extending in a radially outward direction therefrom, said hub comprising an overrunning brake outer race connected to the radial inward portion of said walls, an overrunning brake inner race, overrunning brake elements situated between said races and adapted to accommodate freewheeling of said outer race in one direction while preventing relative rotation between said races in the opposite direction, said inner race being adapted to be connected to a stationary member of said torque converter.

15. A hydrokinetic torque converter comprising a bladed impeller and a bladed turbine situated in toroidal fluid flow relationship and a common torus circuit, a flow-directing stator member situated between the flow exit region of said turbine and the flow entrance region of said impeller, said fluid flow directing member comprising a flow entrance section and a flow exit section, said entrance comprising a radial wall having flow apertures formed therein, said exit section wall also having flow apertures formed therein, the outer peripheral margin of said walls being joined together to define a flow-directing shroud, the material displaced from each aperture in said flow entrance section wall being joined to said flow entrance wall at one margin of the aperture, the material of said flow exit wall being joined to the flow exit wall aperture at one edge thereof, the material displaced from the aperture in said entrance section wall being deformed in the direction of flow, the material displaced from the apertures in said flow exit section wall being deformed so that it registers with the material displaced from the flow entrance section to define continuous blade elements, the material displaced from one aperture of said flow entrance wall overlying the material displaced from an adjacent aperture in said flow entrance wall thereby defining a variable camber blade entrance section which is adapted to register with the material displaced from an aperture in said flow exit wall, means for securing rigidly together the registering portions of the blade sections defined by the material displaced from said flow exit wall and the material displaced from said entrance wall thereby defining rigid blade elements at angularly spaced locations about the axis of said member, said stator comprising a hub, the blade elements defined by said flow entrance section and said flow exit section being arranged in angularly spaced disposition about said hub and extending in a radially outward direction therefrom, said hub comprising an overrunning brake outer race connected to the radial inward portion of said walls, and an overrunning brake inner race, overrunning brake elements situated between said races and adapted to accommodate freewheeling of said outer race in one direction while preventing relative rotation between said races in the opposite direction, said inner race being adapted to be connected to a stationary member of said torque converter.